US005793013A

United States Patent [19]

Read et al.

[11] Patent Number: 5,793,013

[45] Date of Patent: Aug. 11, 1998

[54] MICROWAVE-DRIVEN PLASMA SPRAYING APPARATUS AND METHOD FOR SPRAYING

[75] Inventors: Michael E. Read, Oakton; John F. Davis, III, Alexandria, both of Va.; Michael M. Micci, Warriors Mark, Pa.

[73] Assignee: Physical Sciences, Inc., Andover, Mass.

[21] Appl. No.: 476,081

[22] Filed: Jun. 7, 1995

[51] Int. Cl.$^6$ .......... B23K 10/00

[52] U.S. Cl. .......... 219/121.48; 219/121.51; 219/121.43; 427/446; 588/227; 588/212; 118/723 MW

[58] Field of Search .......... 219/121.43, 121.41, 219/121.52, 121.48; 427/508, 509, 446; 118/723 ME, 723 MW, 719; 588/227, 212

[56] References Cited

U.S. PATENT DOCUMENTS

| | | | |
|---|---|---|---|
| 4,411,989 | 10/1983 | Grow | 435/20 |
| 4,423,303 | 12/1983 | Hirose et al. | 219/121 P |
| 4,433,228 | 2/1984 | Nishimatsu et al. | 219/10.55 R |
| 4,473,736 | 9/1984 | Bloyet et al. | 219/121 PM |
| 4,503,406 | 3/1985 | Bowling et al. | 333/245 |
| 4,543,465 | 9/1985 | Sakudo et al. | 219/121 PD |
| 4,609,808 | 9/1986 | Bloyet et al. | 219/121 PR |
| 4,611,108 | 9/1986 | Leprince et al. | 219/121 PR |
| 4,642,571 | 2/1987 | Minami et al. | 328/59 |
| 4,659,899 | 4/1987 | Welkie et al. | 219/121 PN |
| 4,741,286 | 5/1988 | Itoh et al. | 118/620 |
| 4,745,337 | 5/1988 | Pichot et al. | 315/111.41 |
| 4,766,287 | 8/1988 | Morrisroe et al. | 219/121.52 |
| 4,794,230 | 12/1988 | Seliskar et al. | 219/121.52 |
| 4,833,294 | 5/1989 | Montaser et al. | 219/121.52 |
| 4,853,515 | 8/1989 | Willen et al. | 219/121.47 |
| 4,866,240 | 9/1989 | Webber | 219/121.47 |
| 4,908,492 | 3/1990 | Okamoto et al. | 219/121.52 |
| 4,943,345 | 7/1990 | Asnussen et al. | 156/643 |
| 4,957,061 | 9/1990 | Ando et al. | 118/719 |
| 5,010,220 | 4/1991 | Apte et al. | 219/10.55 M |
| 5,041,713 | 8/1991 | Weidman | 219/121.51 |
| 5,051,557 | 9/1991 | Satzger | 219/121.52 |
| 5,083,004 | 1/1992 | Well et al. | 219/121.5 |
| 5,131,992 | 7/1992 | Church et al. | 204/164 |
| 5,159,173 | 10/1992 | Frind et al. | 219/121.47 |
| 5,179,264 | 1/1993 | Cuomo et al. | 219/121.43 |
| 5,233,155 | 8/1993 | Frind | 219/121.52 |
| 5,270,515 | 12/1993 | Long | 219/121.4 |
| 5,332,885 | 7/1994 | Landes | 219/121.47 |
| 5,349,154 | 9/1994 | Harker et al. | 117/102 |
| 5,389,154 | 2/1995 | Hiroshi et al. | 118/723 MW |

FOREIGN PATENT DOCUMENTS

| | | |
|---|---|---|
| 0354731 | 2/1990 | European Pat. Off. . |
| 0415858A3 | 3/1991 | European Pat. Off. . |
| 63289799 | 11/1988 | Japan . |
| 1184921 | 7/1989 | Japan . |
| 2216047 | 8/1990 | Japan . |
| 4351899 | 10/1992 | Japan . |
| WO94/26952 | 11/1994 | WIPO . |

OTHER PUBLICATIONS

International Search Report in corresponding PCT application number PCT/US96/07837 dated Sep. 18, 1996.

*Primary Examiner*—Mark H. Paschall
*Attorney, Agent, or Firm*—Testa, Hurwitz & Thibeault, LLP

[57] ABSTRACT

A microwave-driven plasma spraying apparatus can be utilized for uniform high-powered spraying. The plasma sprayer is constructed without a dielectric discharge tube, so very high microwave powers can be utilized. Moreover, the plasma sprayer is relatively free of contamination caused by deposits of heat-fusible material.

30 Claims, 4 Drawing Sheets

MICROWAVE-DRIVEN PLASMA SPRAYING APPARATUS AND METHOD FOR SPRAYING

FIELD OF THE INVENTION

The invention relates generally to a plasma spraying apparatus. In particular, the invention relates to an apparatus which utilizes microwave radiation to create a plasma discharge for spraying.

BACKGROUND OF THE INVENTION

Plasma spraying devices for spraying heat fusible materials have proven effective for surface treatment and coating applications. Generally, plasma spraying devices operate by first generating a plasma discharge and then introducing a heat-fusible material into the plasma. A resultant spray of plasma and material is discharged through a nozzle in the form of a plasma jet.

Plasma discharges can be generated in various ways. Conventional plasma spraying devices utilize direct current (hereinafter "DC") plasma discharges. To create a DC plasma discharge, a potential is applied between two electrodes, a cathode and an anode, in a gas. A resulting current passing through the gas excites the gas molecules, thereby creating a plasma discharge. Once a discharge is formed, most of the space between the cathode and anode is filled by a plasma discharge glow. A comparatively dark region forms adjacent to the cathode corresponding to the cathode plasma sheath. A similar dark region forms adjacent the anode, but it is very thin compared to the cathode dark region.

The interaction between the plasma and the electrodes eventually results in erosion of the electrodes. In addition, the interaction between the plasma and the electrodes results in the deposition of some heat-fusible material on the electrodes.

DC plasma discharges can result in unstable operation which may make it difficult to strike and maintain the plasma. Also, the unstable operation may result in nonuniform plasma spraying.

Radio frequency (RF)-driven plasma sprayers have been developed to overcome problems inherent to DC plasma discharge sprayers. Prior art microwave-driven plasma sprayers utilize plasma discharge tubes formed of dielectric material to confine the plasma. Some RF-driven plasma sprayers utilize small diameter discharge tubes to encourage gas circulation at a low flow rate.

Discharge tubes formed of dielectric material are limited in the microwave powers they can withstand. In addition, because of the interaction between the plasma and the dielectric tube, some heat-fusible material deposits on the tube. Deposits of heat-fusible material on the dielectric tube contaminate the sprayer and cause unstable operation which may result in nonuniform plasma spraying.

It is therefore a principal object of this invention to provide a microwave-driven plasma sprayer without a discharge tube which can be utilized for uniform high-powered plasma spraying. It is another object of this invention to provide a plasma sprayer relatively free of contamination caused by deposits of heat-fusible material. It is another object of this invention to provide a plasma sprayer which generates a uniform plasma spray.

SUMMARY OF THE INVENTION

A principal discovery of the present invention is that a high-power microwave-driven plasma sprayer can be constructed with a conductive microwave cavity which directly confines the plasma without the use of a discharge tube. The conductive microwave cavity is thus in direct fluid communication with the plasma. Such a plasma sprayer is essentially free of contamination due to deposits of heat-fusible material and generates a uniform plasma spray.

Accordingly, the present invention features a high-power microwave-driven plasma spraying apparatus. In one embodiment, the apparatus comprises a conductive microwave cavity which directly confines a high temperature plasma. The cavity may have a moveable end for adjusting the cavity length to match the impedance of the cavity to a power source. The microwave cavity includes at least one injection port for introducing a gas suitable for ionization into the cavity and for creating a velocity and swirl adequate to stabilize the plasma in all orientations within the cavity. Numerous gases such as air, nitrogen, oxygen, argon, helium and mixtures thereof may be introduced to form the plasma. In addition, hazardous gases such as nerve gas or volatile organic components (VOC's) may be introduced to form the plasma.

The microwave cavity includes a nozzle for ejecting the plasma from the cavity. The nozzle may have a profile corresponding to either a conical, quasi-parabolic, cylindrical, or a parabolic taper. The nozzle material may be a metal, graphite, ceramic or a mixture thereof. The nozzle may have an aperture with a diameter of 0.5 mm–50 mm. The nozzle may have a variable aperture for controlling output gas velocity or cavity pressure. Such a variable aperture allows control of the pressure and hence the velocity of the output flow. This allows for control of dwell times for power particles in the plasma.

The microwave cavity includes a feeder for introducing heat-fusible powder particulates suitable for reacting with the high temperature plasma. The powder-plasma mixture forms a plasma spray containing the powder particulates. Such a spray can be utilized for coating surfaces exterior to the sprayer or for production of powder or other end products. Numerous heat-fusible materials are suitable for reacting with high temperature plasmas. These materials include most metals, ceramics, and cermets. These material may also include hazardous materials such as aerosol liquids, volatile organic compounds, fuel-contaminated water, or mixtures thereof. The nozzle may be formed of heat-fusible powder particulates which react with the plasma to form a plasma spray. Utilizing such a nozzle will reduce contamination of the plasma spray.

A microwave launcher for coupling microwave power into the cavity is attached to the microwave cavity. The launcher may be a coaxial launcher. The launcher may be separated from the cavity by a microwave-passing window formed of a material substantially transparent to microwave radiation.

A microwave power source for providing microwave power to the cavity is coupled to the microwave launcher. The power source may be a magnetron, klystron, or other microwave source which generates electromagnetic radiation with a frequency of 300 MHz –100 GHz at a power of 1–100 kW.

The microwave power source is coupled to the microwave launcher by a waveguide. A waveguide-to-coaxial coupler may be used to couple the waveguide to the microwave launcher. A tuner such as a triple stub tuner may be positioned within the waveguide to adjust the impedance between the cavity and power source. In addition, an isolator may be positioned within the waveguide to reduce reflections between the microwave power source and the cavity. In one embodiment, a circulator with a dummy load on one port is connected between the microwave power source and the cavity. The circulator directs transmitted microwave power to the cavity and reflected power to the dummy load.

The plasma generating apparatus may include a cooling system for cooling the cavity, the nozzle, or both the cavity and the nozzle. The cooling system may comprise tubing for carrying water or another high thermal conductivity fluid in close proximity to the cavity and nozzle. The tubing may be thermally bonded to the cavity or nozzle. The cooling system may also include a thermal controller for controlling the temperature of the gas. The thermal controller may comprise a means for varying the output power of the microwave power source to regulate the temperature of the cavity and nozzle. In addition, the thermal controller may comprise a means for controlling mass flow through the nozzle to regulate the temperature of the cavity and nozzle. Also, the thermal controller may include a means for mixing a gas that is cooler than the plasma with the powder particulates.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1:
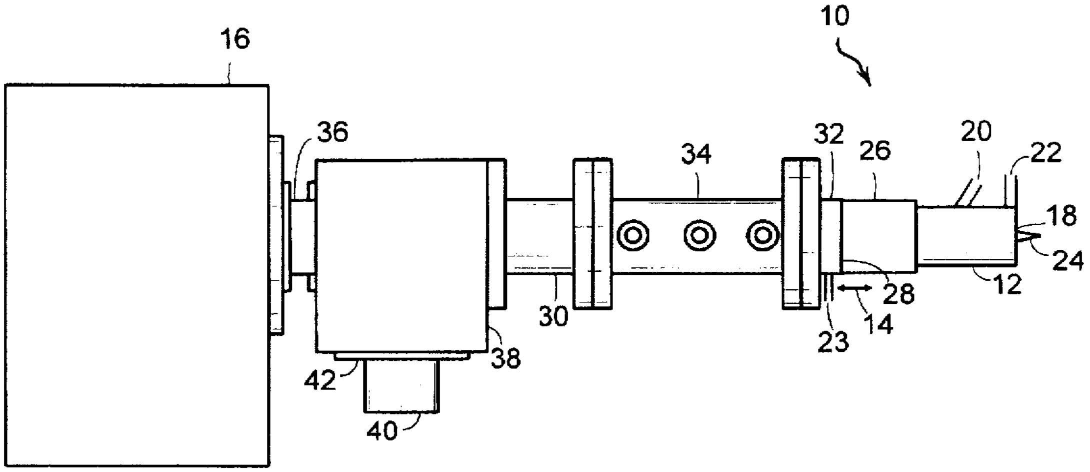
FIG. 1 is a schematic representation of the microwave-driven plasma spraying apparatus of the present invention.

FIG. 1 is a schematic representation of the microwave-driven plasma spraying apparatus of the present invention. A plasma spraying apparatus 10 according to this invention comprises a conductive microwave cavity 12 which directly confines a high temperature plasma. The conductive microwave cavity 12 does not utilize a discharge tube and thus is in direct fluid communication with the plasma. The cavity 12 may have a moveable end 14 for adjusting cavity length to match the impedance of the cavity 12 to a power source 16. The microwave cavity 12 includes a nozzle 18 for ejecting the plasma from the cavity 12.

The microwave cavity 12 includes at least one injection port 20 for introducing a gas suitable for ionization into the cavity 12 and for creating a velocity and swirl adequate to stabilize the plasma in all orientations within the cavity 12. The microwave cavity 12 may include a feeder 22, 23 for introducing heat-fusible powder particulates suitable for reacting with the high temperature plasma. The powder-plasma mixture forms a plasma spray 24 containing the powder particulates. The spray 24 is propelled out of the nozzle 18 under high pressure. Such a spray 24 can be utilized for coating surfaces exterior to the spraying apparatus 10 or can be collected as condensed powder. In another embodiment, the nozzle 18 may be formed of the same material as the powder used in the plasma spray 24. Utilizing such a nozzle 18 will reduce contamination of the plasma spray 24.

A microwave launcher 26 for coupling microwave power into the cavity 12 is attached to the cavity 12. The launcher 26 may be a coaxial launcher with a inner conductor (not shown) and an outer conductor (not shown). The launcher 26 is separated from the cavity 12 by a microwave-passing window 28. The window 28 is formed of a material substantially transparent to microwave radiation. The window 28 is also a pressure plate for maintaining a certain pressure in the cavity 12.

The microwave power source 16 for providing microwave power to the cavity 12 is coupled to the microwave launcher 26. The power source 16 may be a magnetron or a klystron which generates electromagnetic radiation with a frequency of 300 MHz –100 GHz at a power of 1–100 kW.

The microwave power source 16 is coupled to the microwave launcher 26 by a waveguide 30. A waveguide-to-coaxial coupler 32 is used to couple the waveguide 30 to the coaxial microwave launcher 26. A tuner 34 such as a triple stub tuner may be positioned within the waveguide 30 to match the impedance of the cavity to the impedance of the power source. In addition, an isolator 36 may be positioned within the waveguide 30 to reduce reflections between the microwave power source 16 and the cavity 12. A circulator 38 with a dummy load 40 on one port 42 may be connected between the microwave power source 16 and the cavity 12. The circulator 38 directs transmitted microwave power to the cavity 12 and reflected power to the dummy load.

The plasma generating apparatus may include a cooling system (not shown) for cooling the cavity 12, the nozzle 18, or both the cavity 12 and the nozzle 18. The cooling system may comprise tubing for carrying water or another high thermal conductivity fluid in close proximity to the cavity and nozzle. The tubing may be thermally bonded to the cavity 12 or nozzle 18. The cooling system may also include a thermal controller for controlling the temperature of the gas. The thermal controller may comprise a means for varying the power of the microwave power source 16 to regulate the temperature of the cavity 12 and nozzle 18. In addition, the thermal controller may comprise a means for controlling mass flow through the nozzle 18 to regulate the temperature of the cavity 12 and nozzle 18. Also, the thermal controller may include a means for mixing a gas that is cooler than the plasma with the powder particulates.

Figure 2:
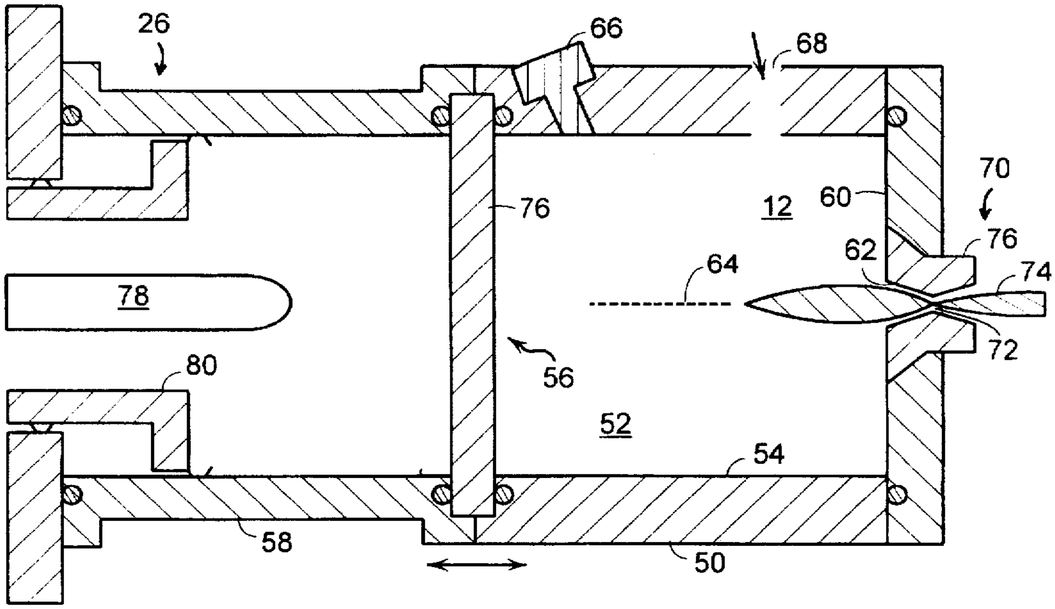
FIG. 2 is a cross-sectional view of one embodiment of a launcher and microwave cavity for the microwave-driven plasma spraying apparatus of the present invention.

FIG. 2 is a cross-sectional view of one embodiment of a launcher 26 and microwave cavity 12 for the microwave-driven plasma spraying apparatus of the present invention. A housing 50 defines an internal circular cavity 52 having internal surfaces 54, an input 56 for receiving the microwave launcher 26, and a front wall 60 terminating in an exit tube 62. The cavity 12 is a conductive microwave cavity which directly confines a high temperature plasma without the use of a discharge tube. The input 90 of the cavity 12 is movable along its longitudinal axis 64, for adjusting of the length of the cavity 12 to achieve resonance in a certain mode of operation, such as the $TM_{01}$ mode. The $TM_{01}$ mode has an axial electric field maxima at the ends of the cavity which is desirable for concentrating power near the nozzle. The housing 50 may be brass and the interior surfaces 54 forming the cavity 12 may be gold-flashed brass. Many other metallic materials can also be used.

The microwave cavity 12 includes at least one injection port 66 for introducing a gas suitable for ionization into the cavity 12 and for creating a velocity and swirl adequate to stabilize the plasma in all orientations within the cavity 12. The injection port 66 is preferably disposed at an angle of 25°–70° to the longitudinal axis of the cavity 64. The angle of orientation of the injection port 66 along with the velocity at which the gas is introduced and the pressure within the cavity 12, control the vorticity of the gas within the cavity 12. Vorticity within the chamber can be chosen to compensate for centripetal forces experienced by the hot gas. The injection port 66 may take the form of a converging or diverging nozzle (not shown) to increase the velocity of the gas and cause impingement against the walls of the cavity.

The gas utilized should be suitable for ionization. Numerous gases such as air, nitrogen, oxygen, argon, helium and mixtures thereof may be introduced to form the plasma. In addition, hazardous gases such as nerve gas or volatile organic compounds may be introduced to form the plasma.

The microwave cavity 12 also includes a feeder 68 for introducing heat-fusible powders, gases or liquids suitable for reacting with the high temperature plasma. Numerous heat-fusible powders are suitable for reacting with high temperature plasmas. These powders include metals, metal oxides, ceramics, polymerics, cermets or mixtures thereof. Liquids suitable for reacting with high temperature plasmas may include paints, aerosol liquids, volatile organic compounds, fuel-contaminated water, or mixtures thereof. Gases suitable for reacting with high temperature plasmas may include nerve gas.

A nozzle 70 is mounted in the exit tube 62. The nozzle 70 may have a profile corresponding to either a conical, a quasi-parabolic, a cylindrical, or a parabolic taper. The nozzle 70 is preferably made of a relatively hard material such as a metal, ceramic, graphite, or a mixture thereof to resist erosion from the heat-fusible materials utilized in spraying. The nozzle 70 may have an aperture 72 with a diameter of 0.5–50 mm. Typically, in a device operating at 2.45-GHz nozzle diameters are 1–10 mm. The nozzle 70 may have a variable aperture (not shown) for controlling output gas velocity or cavity pressure. Such a variable aperture allows control of dwell times for power particles in the plasma.

In another embodiment, the nozzle 70 is formed of the same material as the powder for reacting the plasma with the nozzle to form a plasma spray 74. Utilizing such a nozzle 70 will reduce contamination of the plasma spray 74 and result in a high purity coating. For example, if it is desired to spray powdered alumina, the nozzle 70 may comprise alumina so as to reduce the contamination of the plasma spray 74.

The input of the cavity 56 may be terminated by a microwave-passing window 76 which is formed of a material substantially transparent to microwave radiation. The window 76 is also a pressure plate for maintaining a certain pressure in the cavity. The window 76 can be of varying thickness. For example, the window 76 may be 6–12 mm. Windows having a thickness within this range have proven crack-resistant to pressures in the range of 0 psig to 150 psig.

The microwave launcher 26 is attached to the microwave-passing window 76 and is utilized for coupling microwave power into the cavity 12. The launcher 26 illustrated in FIG. 2, is a coaxial launcher with a inner conductor 78 and an outer conductor 80. Other microwave launchers can be utilized as well.

Figure 3:
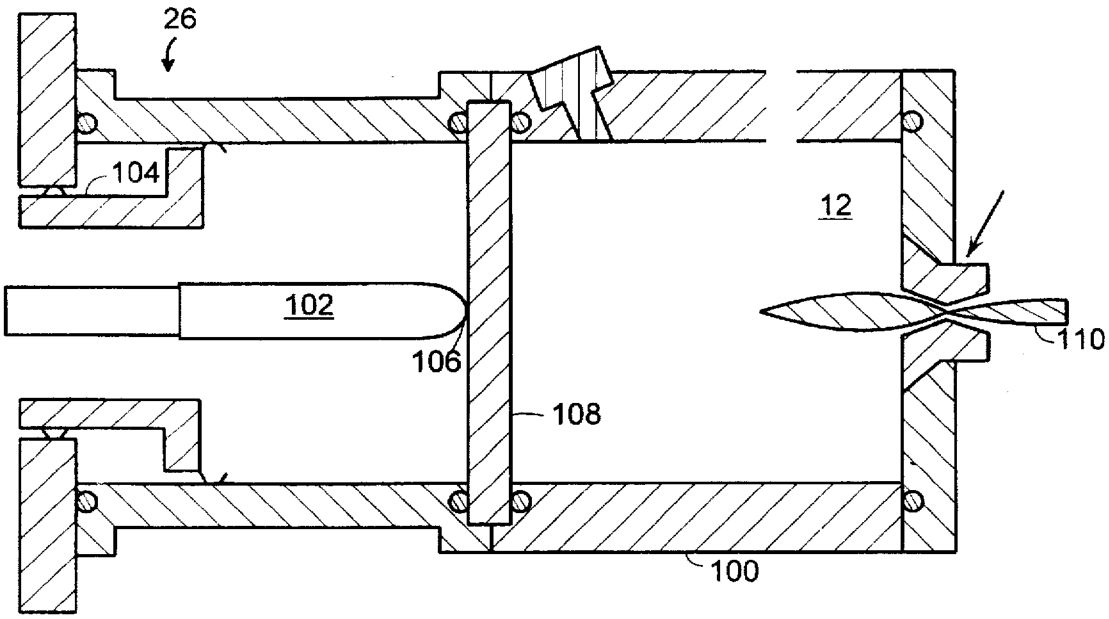
FIG. 3 is a cross-sectional view of another embodiment of a launcher and microwave cavity for the microwave-driven plasma spraying apparatus of the present invention which is suitable for miniaturization.

FIG. 3 is a cross-sectional view of another embodiment of the launcher 26 and microwave cavity 12 for the microwave-driven plasma spraying apparatus of the present invention which is suitable for miniaturization. This configuration can directly replace existing dc-arc based spray guns. The configuration of the launcher 26 and microwave cavity 12 in FIG. 3 corresponds to that of FIG. 2. The configuration of FIG. 3, however, utilizes a smaller housing 100 than the launcher 26 and microwave cavity 12 of FIG. 2. The dimensions of the cavity 12 within the housing 100 may be within the range of 0.8–2 inches. The launcher 26 is also a coaxial launcher with a inner conductor 102 and an outer conductor 104. However, a tip 106 of the inner conductor 102 is positioned in contact with a microwave-passing window 108. The cavity 12 may support a TEM/TM mode. Such a configuration can be made more compact and generate a more efficient and uniform spray 110.

Figure 4:
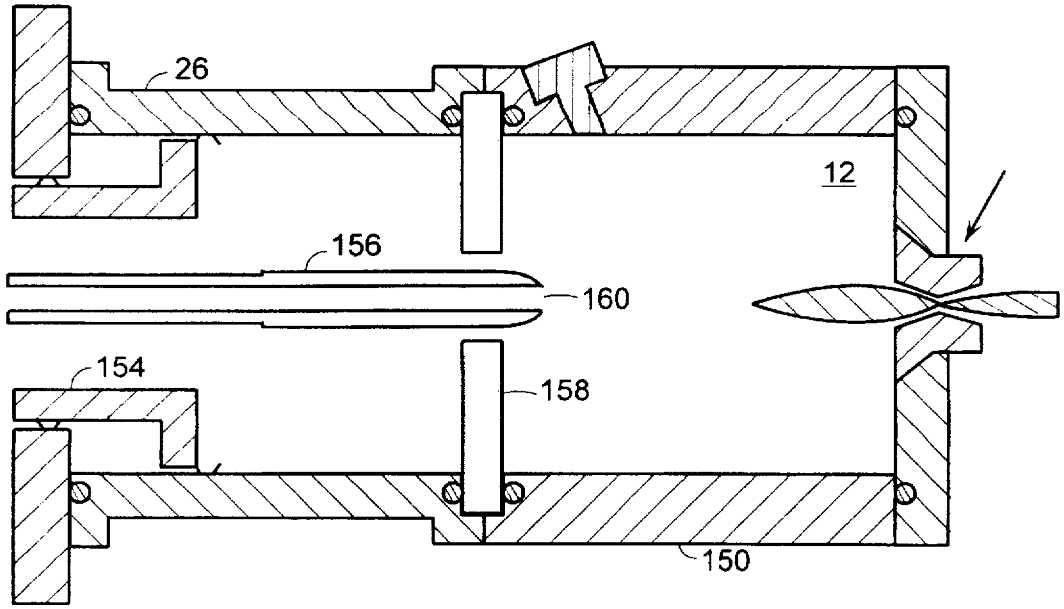
FIG. 4 is a cross-sectional view of another embodiment of a launcher and microwave cavity for the microwave-driven plasma spraying apparatus of the present invention which is suitable for miniaturization.

FIG. 4 is a cross-sectional view of another embodiment of a launcher 26 and microwave cavity 12 for the microwave-driven plasma spraying apparatus of the present invention which is suitable for miniaturization. The configuration of the launcher 26 and microwave cavity 12 in FIG. 4 is similar to that of FIG. 2. The configuration of FIG. 4 also utilizes a smaller housing 150 than the launcher 26 and microwave cavity 12 of FIG. 2. The launcher 26 is also a coaxial launcher with a inner conductor 152 and an outer conductor 154. However, a tip 156 of the inner conductor 152 extends through a microwave-passing window 158. The cavity may support a TEM/TM mode. Such a configuration can generate a more efficient and uniform spray.

In addition, a feeder 160 for introducing heat-fusible powder particulates suitable for reacting with the high temperature plasma may be positioned in the inner conductor 152. In this configuration, the powder/liquid/gas forming the spray material is fed through the inner conductor 152. The powder, liquid, gas material may be introduced into the inner conductor 152 via a waveguide to coaxial adapter, or by other suitable means.

Figure 5:
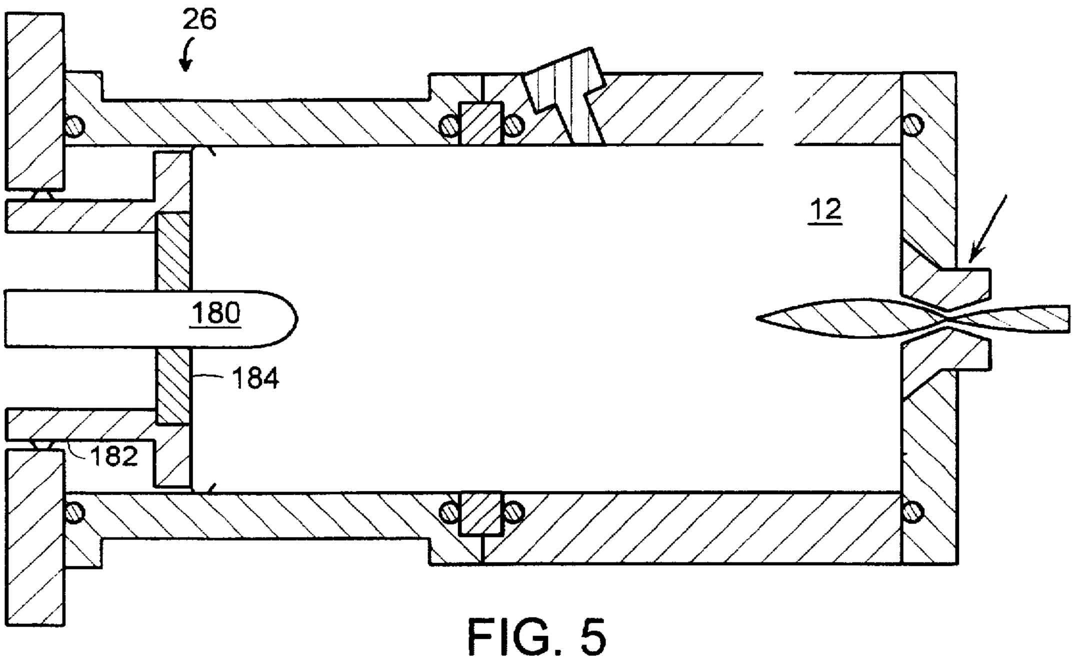
FIG. 5 is a cross-sectional view of another embodiment of a launcher 26 and microwave cavity 12 for the microwave-driven plasma spraying apparatus of the present invention which eliminates the microwave-passing window and is suitable for miniaturization.

FIG. 5 is a cross-sectional view of another embodiment of a launcher 26 and microwave cavity 12 for the microwave-driven plasma spraying apparatus of the present invention. The configuration of the launcher 26 and microwave cavity 12 in FIG. 3 is similar to that of FIG. 2. The configuration of FIG. 5, however, does not include a microwave-passing window. The launcher 26 is also a coaxial launcher with a inner conductor 180 and an outer conductor 182. The inner conductor 180 is supported by a dielectric support 184. The cavity 12 may support a TEM/TM mode. This configuration is easier to manufacture and suitable for miniaturization.

Figure 6:
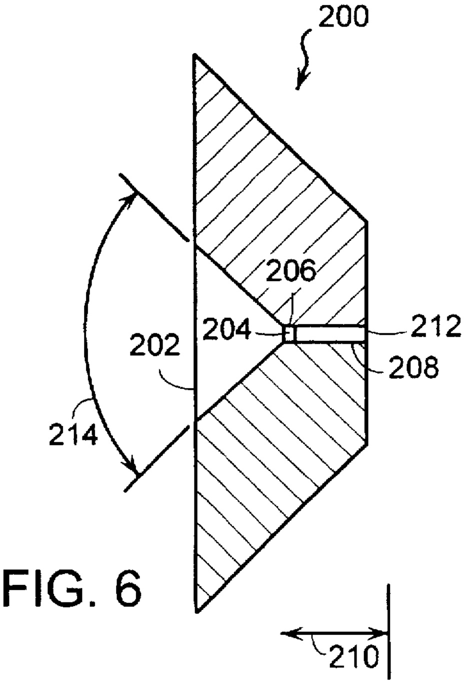
FIG. 6 illustrates one embodiment of a nozzle for the plasma sprayer apparatus of the present invention.

FIG. 6 illustrates one embodiment of a nozzle 200 for the plasma sprayer apparatus of the present invention. The nozzle 200 has an input diameter 202, an aperture opening 204 at throat area 206, a taper 208 from the throat area 206 over a length 210, and an output 212. In this embodiment, the output 212 of the nozzle 200 is quasi-parabolic with an input angle 214. For example, the diameter 202 at the input may be 9.5 mm, the aperture opening 204 at the throat area 206 may be 1.4 mm, and the taper 208 from the throat area 206 over the length 210 may be 0.19 cm over a 0.53 cm length. Other shaped tapers 208 from the throat area 206 over the length 210 may be used, such as a conical, cylindrical, or a completely parabolic taper.

Figure 7:
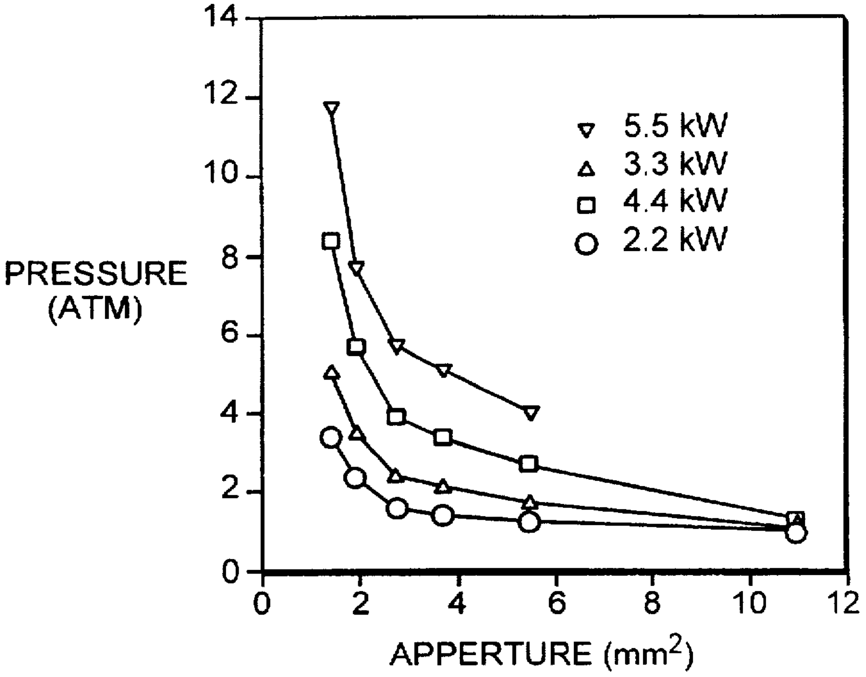
FIG. 7 illustrates a graphical representation of the spray pressure for a variety of different nozzle diameters for a specific experimental device with a microwave frequency of 2.45 GHz.

FIG. 7 illustrates a graphical representation of the spray pressure for a variety of different nozzle diameters for a device operating at 2–5 kw with a microwave frequency of 2.54-GHz. The spray pressure is a function of the nozzle diameter 202 (FIG. 6) in the microwave-driven plasma sprayer apparatus of the present invention. For example, a relatively small nozzle diameter 202 of approximately 1.5 mm with a relatively high input power of 5.5 kW results in a plasma spray having a relatively high pressure output of 12 Atm. Note that as the aperture size grows larger, the variance in input power has little to no effect on the pressure of the output spray.

Figure 8:
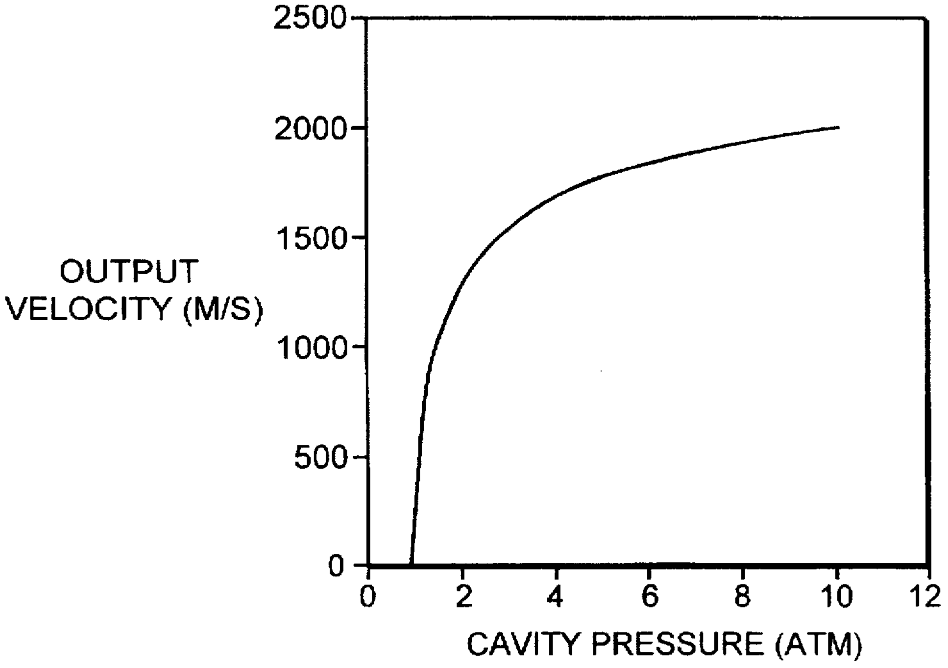
FIG. 8 illustrates a graphical representation of nitrogen gas velocities for different cavity pressures in the microwave-driven plasma sprayer apparatus of the present invention.

FIG. 8 illustrates a graphical representation of nitrogen gas velocities for different cavity pressures in the microwave-driven plasma sprayer apparatus of the present invention. The exit velocity of the spray may be represented by:

$$v=\sqrt{(2\gamma/\gamma-1)RTo(1-(P_{exit}/P_{cavity})^{\gamma-1/\gamma})}$$

where R is the gas constant and To is the cavity temperature. The output velocity rapidly increases in the pressure range of 0.5 ATM and 2.5 ATM and then levels off. A high output velocity of between 1000–2000 meters/second, can be achieved with a cavity pressure of 2–8 ATM. Such a large range of output velocities represent a significant improvement over prior art direct current arc-driven plasma sprayers, which have a typical spray velocity of approximately 900 meters/second.

Equivalents

While the invention has been particularly shown and described with reference to specific preferred embodiments, it should be understood by those skilled in the art that various changes in form and detail may be made therein without departing from the spirit and scope of the invention as defined by the appended claims. For example, although a particular microwave energy coupling configuration is described, it is noted that other coupling configurations may be used without departing from the spirit and scope of the invention.

We claim:

1. A plasma generating apparatus, comprising:

a conductive microwave cavity directly confining a plasma formed therein and comprising (i) at least one injection port having a nozzle and being disposed at a relative angle of 25–70 degrees to a longitudinal axis of the cavity for introducing a gas suitable for ionization into the cavity and for creating a velocity and swirl adequate to produce a stable plasma for all orientations of the cavity, and (ii) a nozzle for ejecting the plasma from the cavity; and a microwave power source coupled to the microwave cavity by a coaxial launcher and providing microwave power to the cavity to ionize the gas therein, the microwave power creating a microwave discharge within the cavity wherein a plasma spray exits from the nozzle.

2. The apparatus according to claim 1 further comprising a launcher coupled to the microwave power source and connected to the cavity to provide the microwave power thereto, the launcher separated from the cavity by a microwave-passing window.

3. The apparatus according to claim 1 wherein the power source comprises a microwave source.

4. The apparatus according to claim 1, wherein the port is adapted for introducing a gas comprising air, nitrogen oxygen, argon, helium, nerve gas, or mixtures thereof.

5. The apparatus according to claim 1, further comprising a hazardous material positioned within the cavity, the hazardous material being suitable for reacting with high temperature plasma.

6. The apparatus according to claim 5 wherein the hazardous material comprises aerosol liquids, volatile organic compounds, fuel-contaminated water, or mixtures thereof.

7. The apparatus according to claim 1, further comprising a feeder for introducing powder particulates into the plasma spray.

8. The apparatus according to claim 7, wherein the feeder introduces powder particulates suitable for mixture with the plasma and, once mixed, for coating surfaces exterior to the sprayer.

9. The apparatus according to claim 7, wherein the feeder introduces powder particulates suitable for reacting with the plasma and, once the powder particulates react with the plasma, for coating surfaces exterior to the sprayer.

10. The apparatus according to claim 7 wherein the powder is selected from the group consisting of metals, ceramics, and cermets.

11. The apparatus according to claim 7 wherein the nozzle consists of a solid form of the power particulates, thereby reducing the contamination of the plasma spray.

12. The apparatus according to claim 7 wherein the feeder introduces power particulates into at least one of the following: (i) the cavity, (ii) the nozzle or (iii) on axis, through an inner conductor.

13. The apparatus according to claim 1, further comprising system for cooling at least one of the following: (i) the cavity and (ii) the nozzle.

14. The apparatus according to claim 13 wherein the system for cooling comprises tubing for carrying water.

15. The apparatus according to claim 1, further comprising a thermal controller for controlling the temperature of the gas.

16. The apparatus according to claim 15 wherein the thermal controller comprises means for varying the power of the microwave power source and means for controlling mass flow through the nozzle.

17. The apparatus according to claim 16, wherein the thermal controller comprises a means for mixing gas with the powder particulates, the gas being cooler than the plasma.

18. The apparatus according to claim 1 wherein the microwave power has a frequency between approximately 300 MHz and 100 GHz.

19. The apparatus according to claim 1 wherein the nozzle has a profile corresponding to one of the following shapes: (i) conical input taper, (ii) a quasi-parabolic taper, (iii) a conical taper, (iv) cylindrical, and (v) parabolic.

20. The apparatus according to claim 1 wherein the nozzle has an aperture with a diameter between approximately 0.5 mm and 50 mm.

21. The apparatus according to claim 1 wherein the nozzle comprises material selected from the group consisting of metal, graphite, ceramics, and mixtures thereof.

22. The apparatus according to claim 1 wherein the nozzle has a variable aperture for controlling output gas velocity or cavity pressure, thereby controlling the dwell time for power particles in the plasma.

23. The apparatus according to claim 1, further comprising coupling means between the cavity and the power source for communicating the microwave power to the cavity.

24. The apparatus according to claim 1 wherein the cavity has a resonant frequency, and a moveable end to adjust the cavity length to match the cavity to the power source.

25. The apparatus according to claim 1 wherein the microwave power is between approximately 1 kW and 100 kW.

26. A plasma generating apparatus, comprising:

a microwave power source;

a conductive microwave cavity supporting a $TM_{ON}$ mode and directly confining a plasma formed therein, the cavity comprising (i) at least one injection port having a nozzle and being disposed at a relative angle of 25–70 degrees to a longitudinal axis of the cavity for introducing a gas suitable for ionization into the cavity and for creating a velocity and swirl adequate to produce a stable plasma for all orientations of the cavity, and (ii) a nozzle for ejecting the plasma from the cavity; and a coaxial microwave launcher disposed opposite the nozzle and separated from the cavity by a microwave-passing window, the launcher supporting a TEM mode that couples microwave power from the microwave power source to the cavity thereby ionizing the gas in the cavity.

27. The apparatus according to claim 24 wherein the coupling means comprising at least one of the following: (i) a launcher, (ii) a microwave waveguide, (iii) a coaxial cable, (iv) an isolator to reduce reflections between the microwave power source and the cavity, (v) a triple stub tuner to adjust the resonance match between the cavity and the microwave power source, (vi) a waveguide to coaxial coupler, and (vii) a coaxial to cavity coupler.

28. The apparatus according to claim 26 wherein the launcher is separated from the cavity by a microwave-passing window.

29. The apparatus according to claim 26 further comprising at least one of the following for coupling the microwave power source to the cavity: (i) a microwave waveguide, (ii) a coaxial cable, (iii) an isolator to reduce reflections between the microwave power source and the cavity, (iv) a triple stub tuner to adjust the resonance match between the cavity and the microwave power source, (v) a waveguide to coaxial coupler, (vi) a coaxial to cavity coupler and (vii) direct coupling between the microwave source and the cavity.

30. A plasma generating apparatus, comprising:

a conductive microwave cavity directly confining a plasma formed therein and comprising (i) at least one injection port having a nozzle and being disposed at a relative angle of 25–70 degrees to a longitudinal axis of the cavity for introducing a gas suitable for ionization into the cavity and for creating a velocity and swirl adequate to produce a stable plasma for all orientations of the cavity, (ii) a feeder for introducing powder particulates into the cavity, and (iii) a nozzle for ejecting the plasma from the cavity; and a microwave power source coupled to the microwave cavity by a coaxial launcher and providing microwave power to the cavity to ionize the gas therein, the microwave power creating a microwave discharge within the cavity wherein a plasma spray exits from the nozzle.

* * * * *

UNITED STATES PATENT AND TRADEMARK OFFICE

CERTIFICATE OF CORRECTION

PATENT NO.: 5,793,013
DATED: August 11, 1998
INVENTOR: Michael E. Read, John F. Davis, III, and Michael M. Micci It is certified that error appears in the above-identified patent and that said Letters Patent is hereby corrected as shown below:

Column 8, claim 4, first line, after "wherein the", insert ---at least one injection---:

Signed and Sealed this

First Day of December, 1998

Attest:

BRUCE LEHMAN

*Attesting Officer*

*Commissioner of Patents and Trademarks*